(12) United States Patent
Guerche et al.

(10) Patent No.: US 7,275,585 B1
(45) Date of Patent: Oct. 2, 2007

(54) PROCESS FOR THE MANUFACTURE BY LOST WAX MOULDING OF PARTS THAT INCLUDE AT LEAST ONE CAVITY

(75) Inventors: Didier Guerche, Conflans Ste Honorine (FR); Jacky Pierre Tabardin, Villiers le Bel (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/201,118

(22) Filed: Aug. 11, 2005

(30) Foreign Application Priority Data

Aug. 12, 2004 (FR) .................................. 04 51845

(51) Int. Cl.
*B22C 9/04* (2006.01)
(52) U.S. Cl. ........................................ 164/516; 164/45
(58) Field of Classification Search .................. 164/45, 164/516–519, 122.1, 122.2, 361
See application file for complete search history.

(56) References Cited

U.S. PATENT DOCUMENTS

| | | | |
|---|---|---|---|
| 4,093,017 A * | 6/1978 | Miller et al. ................... 164/28 |
| 4,487,246 A | 12/1984 | Frasier | |
| 4,596,281 A * | 6/1986 | Bishop ......................... 164/32 |
| 5,291,654 A * | 3/1994 | Judd et al. ............. 29/889.721 |
| 5,950,705 A | 9/1999 | Huang | |
| 6,340,047 B1 * | 1/2002 | Frey ............................ 164/137 |
| 6,530,416 B1 * | 3/2003 | Tiemann ...................... 164/137 |

FOREIGN PATENT DOCUMENTS

| EP | 0 084 234 A1 | 7/1983 |
|---|---|---|
| EP | 1 188 500 A1 | 3/2002 |

\* cited by examiner

*Primary Examiner*—Kuang Y. Lin
(74) *Attorney, Agent, or Firm*—Oblon, Spivak, McClelland, Maier & Neustadt, P.C.

(57) ABSTRACT

A process for the manufacture of a part includes the steps of forming a core in a ceramic material, inserting the core into in a wax mold, placing an element on the core thereby forming a spacer between the core and an internal wall of the wax mold, forming a wax model of the part with the core by injecting wax into the mold, forming a shell mold in ceramic material from the wax model, removing the wax, and pouring casting metal into the shell mold, wherein the element is of elongated form and placed on the core in a laying position.

17 Claims, 2 Drawing Sheets

PROCESS FOR THE MANUFACTURE BY LOST WAX MOULDING OF PARTS THAT INCLUDE AT LEAST ONE CAVITY

BACKGROUND OF THE INVENTION

1. Field of the Invention

This present invention concerns the area of turbines, in particular that of the turbines of gas-turbine engines, and is aiming at a process for the manufacture by lost wax moulding of parts, in particular of blades, including cavities intended for the circulation of cooling fluids.

2. Description of the Related Art

The blades of turbines that are subjected to high thermal stresses include resources for cooling by the circulation of a cooling fluid, generally of air in the case of a gas-turbine engine, within cavities created within the blade.

Furthermore, the blades of turbines are now generally manufactured by the lost wax moulding process. This technique consists of creating a model in wax or another equivalent temporary material, of the part that one wishes to mould. The model is then placed in a ceramic shell mould. The latter is manufactured by successive dipping of the model in slurry mixtures containing a ceramic material and the addition of stucco to the layer formed between each dipping. The mould is dried, and then the wax that it contains is removed by a first oven treatment at a suitable temperature, followed by further oven treatment of the mould at high temperature in order to give it the strength necessary for the casting process. There then remains the replica of the model in the form of a mould into which the casting metal is poured. After cooling, the mould is broken to release the part. The latter then undergoes a simple finishing process.

When the blade includes cavities for the circulation of a cooling fluid, it is necessary to incorporate one or more cores into the model. This phase of the process includes firstly the separate manufacture of the core or cores by moulding them in a ceramic material consolidated by a binder, assembling them where appropriate, and then positioning of the core or cores in a wax mould. A model is thus moulded by the injection of wax into the wax mould, so that the model forms the replica of the part to be cast.

FIG. 1 shows, in section view perpendicular to the axis of the part, a wax mould 10 whose internal wall is the image of the part to be cast. Here, this mould is in two parts 10A and 10B. This mould includes a core 13. Here, the core is composed of a multiplicity of branches 13A to 13G parallel to each other and attached to a common root. Between them, the branches define spaces which will form partitions after pouring the metal. In order to provide for the retention of the core within the mould, small cones 15 are included in a plastic material. The function of these cones is to maintain a space between the walls of the core and the internal wall of the mould. When wax is injected, any irregularity of the layer caused by unwanted movement of the core is thus prevented.

The next stage consists of forming a ceramic mould around the model obtained after its extraction from the mould 10. The cones are no longer sufficient to guarantee the quality of the part, since they are removed with the wax at the moment of dewaxing the mould. In order to ensure correct positioning of the core in the shell mould, and to prevent it from moving at the moment of pouring the molten metal, rods are fitted on the model as illustrated in FIG. 2. This figure shows the wax model within the shell mould 12 in ceramic material. Here, these rods 16 are placed in the area close to the trailing edge, through the layer of wax 17, bearing against one face of the core 13. These rods are in platinum and are melted at the moment of pouring the molten alloy. Materials other than platinum, and performing the same function, can also be used.

To hold the rods 16 in position during the operations for creation of the shell mould, wax beads 18 are added around the rods. These beads are embedded in the wall of the shell mould 12 and the external part of the rods 16.

When the wax has been removed from the mould, the casting metal is poured, filling the space between the walls of the mould and those of the core. The rods are dissolved in the metal. After appropriate cooling, the elements constituting the core, for the creation of one or more cavities, are removed.

The result is the part shown in FIG. 3. During the finishing stage, it is necessary to remove the beads 18' which have formed at the surface of the blade. When this operation is manual, it cannot be fully controlled, and this may give rise to significantly uneven wall thicknesses and lead to a high rejection rate. The particularly close tolerances of the wall thicknesses in these areas leave very little margin for error.

It can also be seen that the process does not allow one to obtain a part whose quality is optimal. The critical area of the blade is neither located perfectly in its environment nor immobilised during the injection of the wax, so that a positioning defect can already be observed at this stage of manufacture. This, added to the loss of material during the finishing operation, increases the risk that one will not achieve a product of satisfactory quality.

Moreover, the beads, being anchored in the ceramic shell, are the seat of mechanical stresses during removal of the metal, which can generate re-crystallised grains during the heat treatment process. The part then has to be scrapped.

It can also be observed that the operation for positioning the platinum rods and beads on the wax model is lengthy and difficult.

Finally, the operations of grinding and elimination of the beads have a cost which it is desirable to avoid.

SUMMARY OF THE INVENTION

The purpose of the invention is to remedy these drawbacks, and to control the wall thicknessess, in particular in the critical areas of low thickness, and especially at the trailing edge of the blade.

According to the invention, the process for the manufacture by lost wax moulding of a part, such as a turbine blade, that includes at least one cavity, and in which, a core is created in ceramic material to reproduce the said cavity, the core is introduced into a wax mould, a model is created in wax of the part with the core by injection of wax into the mould, a shell mould is formed in ceramic material from the wax model, the wax is removed, and the casting metal is poured into the shell mould, is characterised by the fact that at least one element is placed on the core forming a spacer between the wall of the core and the internal wall of the wax mould, before injection of the wax into the mould, the element being of elongated shape, placed on the core layer in the direction of its length and in contact with the said wall of the mould.

By means of this solution, it is possible to cast both lower and upper walls that require no machining. The integrity of the model taken from the mould after injection is fully preserved.

In addition, the thicknesses are guaranteed by the distance pieces, from injection of the wax up to the casting process, in a more precise manner. Both casting and finishing times are reduced, while also improving the quality of the finished product.

According to another characteristic, a cavity is created in the wall of the core to accommodate the element forming a spacer. This cavity should preferably be blind, and can be created at the moment of formation of the core or can be machined.

It is preferable that the element should be in the form of a rod or a pin. This element can have a circular or polygonal section, and square, rectangular or hexagonal in particular. It bears against both the wall of the core and the internal wall of the wax mould.

According to another characteristic, the core includes notches in the surfaces, to constitute disrupters of fluid flow in the part, and at least one element is inserted in a notch.

According to another characteristic, the core includes notches in the surfaces, to constitute disrupters of fluid flow in the part, and at least one element is placed in a direction parallel to the notches.

According to another characteristic, the core includes notches in the surfaces, to constitute disrupters of fluid flow in the part, and at least one element is placed so as to former an angle, and a right-angle in particular, in relation to the said notches.

The invention also covers a part obtained according to the process, with at least one disrupter of fluid flow within the part, formed from a housing of one of the said elements.

The invention applies in particular to the manufacture of a mobile or stator-type turbine blade on which at least one element is placed on the lower surface and one element on the upper surface.

Other characteristics and advantages will appear on reading the following description of a non-limited method for the implementation of the invention. This refers to the appended drawings, in which:

DETAILED DESCRIPTION OF THE PREFERRED EMBODIMENTS

Figure 1:
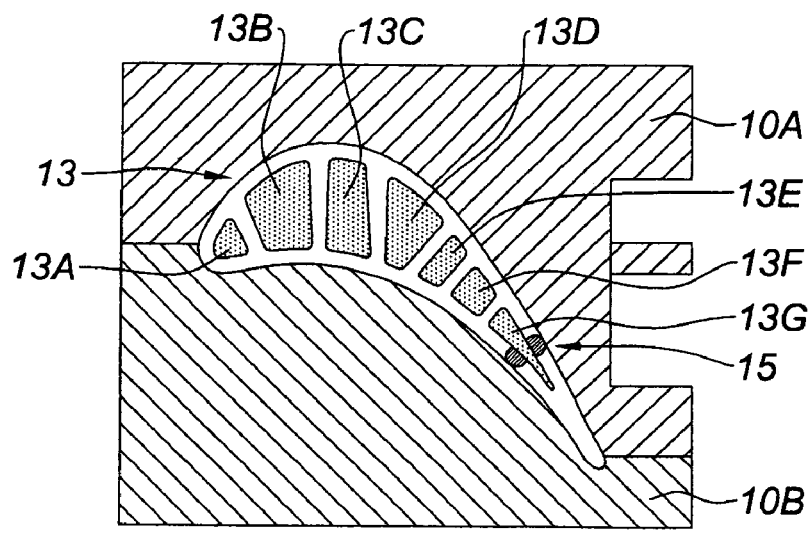
FIGS. 1 to 3 shown the stages of manufacture of a blade according to previous techniques.
Figure 2:
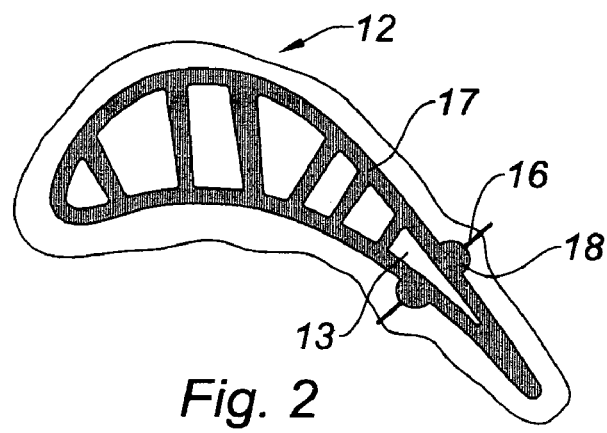
Figure 3:
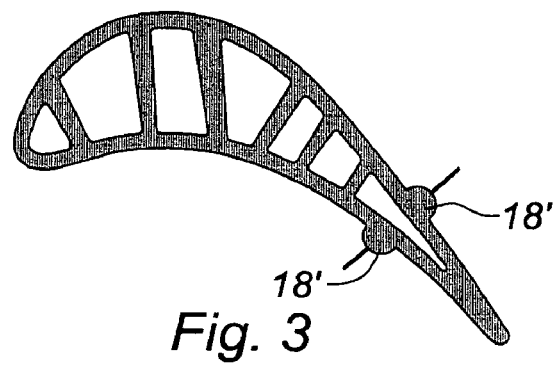
Figure 4:
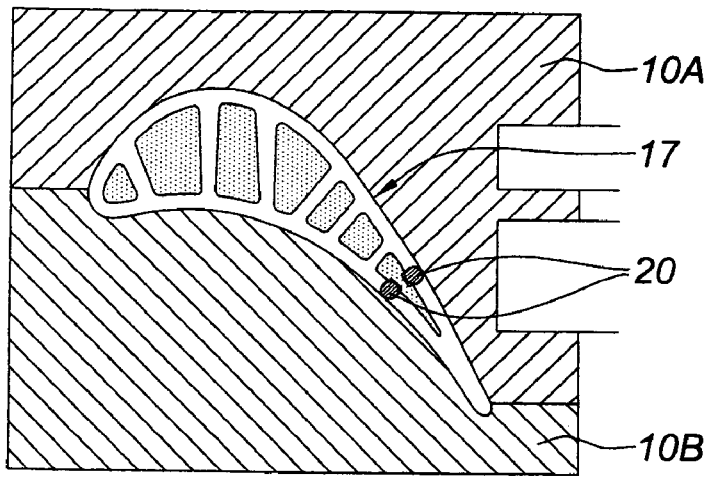
FIG. 4 shows a section view, perpendicular to the axis, of the assembly according to the invention of a blade core in the wax mould.

Referring directly to FIG. 4, we see the model of the part, which is a blade of the same profile as that of the previous state of the art as presented earlier. We find the core 13 inserted into the two halves 10A and 10B of the wax mould 10. The core 13 is enclosed in a covering of wax 17 which has been injected into the mould and which occupies all of the empty spaces between the different elements of the core on one hand, and between the core and the internal wall of the mould on the other. According to the invention, platinum spacing elements 20 have been positioned at the formation of the model in the mould.

Figure 5:
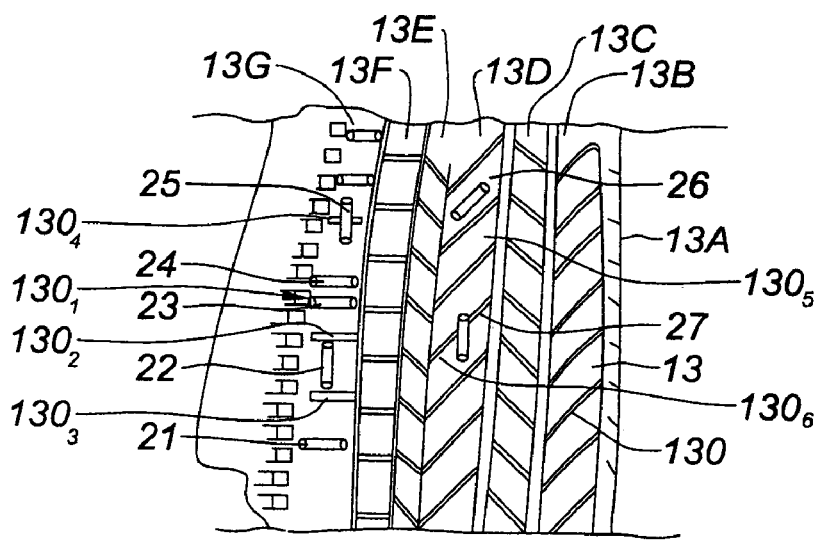
FIG. 5 shows a partial view facing the wall of the ceramic core, with different positions of the elements forming a spacer.

The platinum can be replaced with another material, depending on the nature of the metal used for the casting process. These elements are embedded into the thickness of the wax covering 17. They are flush with the outer surface of the wax covering after extraction of the model. These elements 20 are in particular positioned approximately at the same place as in the solution for the previous state of the art, here toward the trailing edge of the blade. FIG. 5 shows different possible positions for these elements 20. The core is shown partially on one face. It is composed of several parts 13A to 13G assembled side by side. These parts are connected together at one end. We see approximately transverse notches 130, some being perpendicular to the longitudinal axis of the core, while others form an angle which is determined in relation to this axis. These notches 130 form cavities for the molten metal. After pouring the metal, reliefs are thus formed within the channels. They have the function of disrupting the flow of the cooling fluid which circulates within the cavities of the part.

The elements 20 preferably take the form of a rod or a pin and are glued into a housing which has been made beforehand in the walls of the core. In accordance with requirements and with geometry, it is possible to position a single, isolated element, like that shown at 21 for example. This element 21 is placed transversally in relation to the part 13 of the core on which it is placed. The length of the element 21 is less than the width of the part 13. The element can be placed mostly toward the upper end of the distant part of the foot, like element 23 or 24. In the case of element 23, the housing has been created in the very notch of the flow disrupter.

The element can also be placed in the direction of the axis of the part, a blade for example, as shown in positions 22 or 25. In position 22, it is placed perpendicularly between two adjacent notches $130_2$ and $130_3$. In position 25, it overlaps one of the notches $130_4$.

In position 26, the element is placed parallel to notch $130_5$, which itself is inclined in relation to the axis. Position 27 shows an overlapping of notch $130_6$, as for position 25. According to another variant, the element is glued onto the surface with no modification of the latter.

FIG. 4 shows an element with round section, but this is not the only suitable shape. Its thickness is adapted to that of the wall in which it is embedded.

Figure 6:
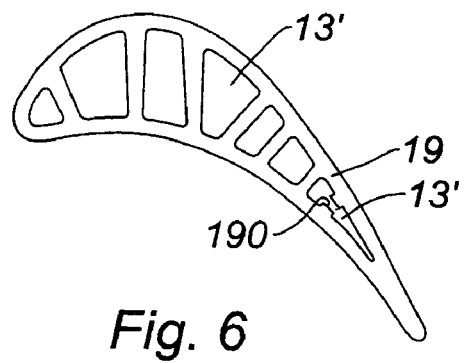
FIG. 6 shows the appearance of the part in section view perpendicular to its axis after the casting process and removal of the ceramic core.

FIG. 6 shows the part when finished. The elements in platinum are dissolved in the metal at the moment of the pouring process. It can be seen that it has not been necessary to grind the surface of the part, because it has no protuberances. We find a thickening 190 of the wall 19 of the part within the cavity 13' of the blade corresponding to the part of the core on which the housing of the element 20 was formed. It has been verified that this protuberance does not affect the characteristics of the blade in any way. According to another aspect of the invention, this protuberance itself constitutes a flow disrupter. It is therefore possible to take advantage of the technical constraint imposed by the moulding.

We have thus described the method employed for hollow turbine blades. However the invention applies to all types of hollow part which include low wall thicknesses that are difficult to control.

The invention claimed is:

1. A process for the manufacture by lost wax moulding of a part that includes at least one cavity, comprising, forming a core in a ceramic material to reproduce said cavity, inserting the core into in a wax mould, placing at least one element on the core thereby forming a spacer between the core and an internal wall of the wax mould, forming a wax model of the part with the core by injecting wax into the mould, forming a shell mould in ceramic material from the wax model, removing the wax, pouring casting metal into the shell mould, and dissolving said at least one element with the casting metal during said pouring of said casting metal, wherein said dissolving of said at least one element is performed such that an outer surface of said part is free of protuberances at a location where said at least one element was placed, and wherein the element is of elongated form and placed on the core in a laying position such that the element is flush with an outer surface of the wax model formed by injecting wax into the mould.

2. A process according to claim 1, further comprising:

forming a cavity in a wall of the core, and placing said element forming said spacer into said cavity in the wall of the core.

3. A process according to claim 1, wherein the element is in the form of a rod with a circular section.

4. A process according to claim 1, wherein the element is in the form of a rod with a polygonal section.

5. A process according to claim 2, wherein the core includes notches forming disrupters of fluid flow in the part, and said placing of said at least one element on the core comprises inserting said at least one element into one of said notches.

6. A process according to claim 2, wherein the core includes notches forming disrupters of fluid flow in the part, and said placing of said at least one element on the core comprises placing said at least one element in a direction parallel to the notches.

7. A process according to claim 2, wherein the core includes notches forming disrupters of fluid flow in the part, and said placing of said at least one element on the core comprises placing said at least one element so as to form an angle with respect to said notches.

8. A process according to claim 1, wherein the part is a turbine blade, and said placing of at least one element on the core comprises placing at least one element on a side of a lower surface of said core and placing at least one element on a side of an upper surface of said core.

9. A process according to claim 2, wherein said forming of said cavity in the wall of the core is performed at a same time as said forming of said core.

10. A process according to claim 4, wherein said element is in the form of a rod with a square section.

11. A process according to claim 4, wherein said element is in the form of a rod with a rectangular section.

12. A process according to claim 4, wherein said element is in the form of a rod with a hexagonal section.

13. A process according to claim 7, wherein said angle is a right angle.

14. A process according to claim 1, wherein said dissolving of said at least one element is performed such that an inner surface of said part has a protuberance at a location where said at least one element was placed.

15. A process according to claim 1, wherein said method is free of any step of grinding a surface of said part at a location where said at least one element was placed.

16. A process according to claim 1, wherein said at least one element is made of platinum.

17. A process according to claim 1, wherein said placing of said at least one element on the core comprises gluing said at least one element on a wall of the core.

* * * * *